United States Patent [19]

Haas et al.

[11] 3,909,114

[45] Sept. 30, 1975

[54] VARIABLE SPHERULITIC DIFFRACTION

[75] Inventors: Werner E. L. Haas, Webster; James E. Adams, Ontario, both of N.Y.

[73] Assignee: Xerox Corporation, Stamford, Conn.

[22] Filed: May 28, 1974

[21] Appl. No.: 473,597

[52] U.S. Cl. ........ 350/160 LC; 252/299; 350/162 R
[51] Int. Cl.[2] .......................................... G02F 1/13
[58] Field of Search ... 252/299; 350/160 LC, 162 R

[56] References Cited
UNITED STATES PATENTS
3,806,230    4/1974    Haas ............................. 350/160 LC
3,813,145    5/1974    Hedman, Jr. et al. ......... 350/160 LC

OTHER PUBLICATIONS
Carroll, "Liquid-Crystal Diffraction Grating", J. Appl. Phy., Vol. 43, No. 3, pp. 767–770, March 1972.

*Primary Examiner*—Edward S. Bauer
*Assistant Examiner*—Matthew W. Koren
*Attorney, Agent, or Firm*—George J. Cannon; David C. Petre; James J. Ralabate

[57] ABSTRACT

Variable diffraction of light is provided by utilization of a novel, stable spherulitic texture of a liquid crystalline composition. Light directed upon an array of spherulites in the liquid crystalline composition is diffracted; and the diffraction is changed by applying a voltage across the layer of liquid crystalline composition which results in the change in size of the spherulites. The variable diffraction thus produced can be utilized in optical filters, modulators, color displays and beam splitters.

22 Claims, 10 Drawing Figures

VARIABLE SPHERULITIC DIFFRACTION

BACKGROUND OF THE INVENTION

This invention relates to liquid crystalline materials having optical storage capability and more particularly relates to a novel, stable liquid crystalline spherulitic texture, a process for the preparation thereof, the erasure thereof and the use thereof in liquid crystalline displays.

Liquid crystalline materials having optical storage capability are disclosed in U.S. Pat. Nos. 3,642,348; 3,680,950; 3,704,056. These liquid crystalline systems are transformed from a cholesteric liquid crystalline material from one of its Grandjean and focal-conic texture states to the other of its texture states. That is, transformation from Grandjean to focal-conic or from focal-conic to Grandjean.

Cholesteric liquid crystalline materials are known to exhibit various observable textures. For example, cholesteric liquid crystals may adopt a focal-conic, or a Grandjean plane texture as modifications of the cholesteric mesophase itself, as described in Gray, G.W., MOLECULAR STRUCTURE AND THE PROPERTIES OF LIQUID CRYSTALS, Academic Press, London, 1962, pp. 39–54.

Generally speaking, liquid crystalline substances exhibit physical characteristics which include characteristics typically associated with liquids and characteristics which are typically associated with solid crystals. The name "liquid crystals" has become generic to substances exhibiting these dual properties. In addition to the cholesteric mesophase, liquid crystals are known to exist in the smectic and nematic mesophases. The three mesophase forms of liquid crystalline materials mentioned above are characterized by different structures wherein the molecules of the compound are arranged in a molecular structure which is unique to each of the three mesomorphic structures.

Each of these structures is well known in the liquid crystal art. For example, the smectic mesophase is typically structurally described as having its molecules arranged in layers with the major axes of the molecules approximately parallel to each other and approximately normal to the planes of the layers. Within a given layer, the molecules in the smectic mesophase may be organized in uniform rows or randomly distributed throughout the layer. The layers of the smectic mesophase are free to move in relation to each other because the attractive forces between the layers are relatively weak, thereby providing the smectic liquid crystalline substances with the mechanical properties of a planar or two-dimensional, soap-like fluid.

The nematic mesophase, on the other hand, is typically described in the literature as having molecules which are not organized into definite layers as in the smectic structure but which molecules have their major axes lying approximately parallel to one another locally.

The cholesteric mesophase is typically described in the literature as having molecules believed to be arranged in definite layers as in the smectic mesophase; however, within a given layer, molecules are believed to be arranged with their major axes approximately parallel to a fashion resembling the structure of nematic liquid crystals. The cholesteric structure derives its name from the fact that materials exhibiting the cholesteric liquid crystalline structure typically have molecules which are derivatives of cholesterol and which are shaped very similarly to molecules of cholesterol. Because of the shape of the cholesteric molecule, in the cholesteric structure the direction of the major axes of the molecules in each of the aforementioned thin layers is displaced slightly from the direction of the major molecular axes in the adjacent molecular layers. When compared to a hypothetical straight line axis passing through a cholesteric liquid crystalline substance and perpendicular to the molecular planes within said substance, the angular displacement of the direction of the molecular axes within each adjacent molecular layer traces out a helical path around the hypothetical straight line axis.

More particularly, with respect to the cholesteric mesophase, the two predominately studied textures are typically described in the literature as follows. The focal-conic and Grandjean textures are similar to each other in that they both have the same local symmetry, namely, helical; but the orientation of the helical regions vary greatly. The Grandjean texture consists of regions of helical order the axes of which are all approximately parallel to each other and normal to the substrate, whereas the focal-conic texture consists of similar regions the axes of which are all approximately parallel to the substrate and oriented randomly in that plane. The Grandjean texture of the cholesteric mesophase is typically characterized by selective dispersion of incident light around a wavelength $\lambda_o$ (where $\lambda_o = 2np$, where $n$ equals the index of refraction of the liquid crystalline film and $p$ equals the pitch of the liquid crystalline film) and optical activity for wavelengths of incident light away from $\lambda_o$. If $\lambda_o$ is in the visible spectrum, the liquid crystalline film appears to have the color corresponding to $\lambda_o$ for normal incidence and normal observation, and if $\lambda_o$ is outside the visible spectrum the film appears colorless and non-scattering. The Grandjean texture of cholesteric liquid crystals is sometimes referred to as the "disturbed" texture. The focal-conic texture is also typically characterized by selective dispersion but in addition this texture also exhibits diffuse scattering in the visible spectrum, whether $\lambda_o$ is in the visible spectrum or not. The appearance of the focal-conic texture state is typically milky white. The focal-conic texture of cholesteric liquid crystals is sometimes referred to as the "undisturbed" texture.

With regard to mixtures of nematics and optically active materials, it has been reported by A. D. Buckingham et al., Chem. Phys. Letters, 3, 7, 540 (1969) that the addition of small amounts, for example, about 10% by weight or less, of optically active, non-mesomorphic materials such as l-menthol and tartaric acid to nematic liquid crystalline materials will provide compositions having the optical properties of the cholesteric liquid crystalline mesophase. Also, U.S. Pat. No. 3,806,230 to Werner E. L. Haas, and assigned to a common assignee, discloses that liquid crystalline compositions possessing the optical properties of the cholesteric liquid crystalline mesophase and comprising a nematic liquid crystalline material and at least one optically active, non-mesomorphic material have optical storage capabilities upon removal of an applied electric field or current. An image formed according to the disclosure of said Application is typically scattering and contrasts with the clear unaffected region not subjected to the electrical field. The Application discloses that the image can be erased with a high frequency A.C. field.

Greubel and Wolff in *Appl. Phys. Letters*, 19, 7, 213 (1971) described an electro-optic effect in liquid crystals called variable grating mode. Thin cells containing homogeneously aligned nematics (molecular axes parallel to the substrate) exhibit a system of linear domains which appear once an applied voltage exceeds a threshold value. The domain size can be controlled by the applied voltage, and the electro optics cell acts as a variable volume grating. Before application of the field and after removal of the field, no domains are present.

In new and growing areas of technology such as liquid crystalline imaging systems, new methods, apparatus, compositions, and articles of manufacture are often discovered for the application of the new technology in a new mode. The present invention relates to a new and advantageous system for imaging liquid crystalline members.

SUMMARY OF THE INVENTION

It is, therefore, an object of this invention to provide a novel electro-optic effect.

It is another object of this invention to provide a novel process for producing light diffraction.

It is yet a further object of this invention to provide a novel process for varying the diffraction of light.

It is is still a further object of this invention to provide an optical notch filter.

It is another object of this invention to provide a novel optical band pass filter.

It is another object of this invention to provide a novel beam splitter.

It is another object of this invention to provide a novel color display system.

It is yet still a further object of this invention to provide a novel optical deflector.

Another object of this invention is to provide a novel optical modulator.

The foregoing objects and others are accomplished in accordance with this invention by utilizing a novel, stable spherulitic texture of a liquid crystalline composition wherein the size of the spherulites, once created, increase in size with application of a D.C. or low frequency A.C. voltage or potential; and, once increased in size by application of said voltage, the size of the spherulites can be decreased or increased, respectively, by decreasing or increasing the voltage or potential applied. Light directed upon an array of said spherulites, in the absence of an applied voltage or potential, is diffracted and a diffraction pattern can be observed. Upon application of a voltage or potential which increases the size of the spherulites, the array is altered and at least becomes more densely packed. This causes a change in the degree of diffraction of light and thereby forms the basis for the variable diffraction of light in accordance with the present invention. The size of the spherulites can be increased to such an extent that dense packing causes the spherulites to assume a hexagonal shape. The diffraction of light is, again, changed in degree and the resulting diffraction pattern, itself, becomes hexagonal in shape. Thus, the observed diffraction patterns corresponding to the variable spherulitic texture have a direct relationship in size and shape to the size and shape of the spherulites in the array of spherulites in the spherulitic texture.

BRIEF DESCRIPTION OF THE DRAWINGS

For better understanding of the invention as well as other objects and further features thereof, reference is made to the following detailed disclosure of the preferred embodiments of the invention taken in conjunction with the accompanying drawings thereof, wherein:

FIG. 6 is a schematic cross-sectional illustration of the embodiment of FIG. 5 utilized in conjunction with an optical stop and an optional lens to provide an embodiment suitable for color display, optical filters, and the like.

DESCRIPTION OF THE PREFERRED EMBODIMENTS

In accordance with the process of the instant invention, liquid crystalline compositions of dielectrically negative nematic liquid crystalline materials and from about 0.4% by weight to about 3% by weight optically active materials are utilized in the state of the spherulitic texture of said liquid crystalline compositions. More particularly, the array of spherulites is varied by varying the size and shape of the individual spherulites.

PRODUCTION OF THE NOVEL, STABLE SPHERULITIC TEXTURE

Liquid crystalline compositions of dielectrically negative nematic liquid crystalline materials and from about 0.4% by weight to about 3% by weight optically active materials are provided on a substrate in layer configuration and in either the homeotropic or homogeneous texture of the nematic mesophase. The layered compositions are characterized by a helical pitch to layer thickness ration of from about 1 to about 10, and by either the homeotropic texture of the nematic mesophase (major axes of the molecules parallel to one another and perpendicular to the plane of the layer) or the homogeneous texture of the nematic mesophase (major axes of the molecules parallel to one another and parallel to the plane of the layer) in at least one region or portion of interest of the layer.

The homeotropic or homogeneous portion or region of interest of the layer is transformed from homeotropic or homogeneous texture to a novel, stable spherulitic texture upon removal of an applied D.C. or low frequency A.C. voltage or potential.

The nematic liquid crystalline material can comprise any suitable dielectrically negative liquid crystalline nematic. These nematics align with the major axes of their molecules perpendicular to the electrical field created by a voltage applied across a layer of the nematic liquid crystalline material.

Typical suitable nematics are disclosed in Vol. 18, Ann. Physique, p. 273, G. Friedel (1922), hereby expressly incorporated by reference. Typical suitable dielectrically negative nematics include p-azoxyanisole, p-azoxyphenetole, p-ethoxybenzylidene-p'-n butylaniline, trans-4-butyl-α-chloro-4'-ethoxystilbene, trans-4-octyl-α-chloro-4'-ethoxystilbene, p-methoxybenzylidene-p'-n butylaniline; mixtures of the above, and others.

Optically active material added to the dielectrically negative nematic to provide the liquid crystalline composition can comprise any suitable optically active materials, whether mesomorphic or non-mesomorphic. Mesomorphic optically active materials include, for example, optically negative liquid crystalline materials such as, for example, derivatives from reactions of cholesterol and inorganic acids; for example; cholesteryl chloride, cholesteryl bromide, cholesteryl iodide, cholesteryl fluoride, cholesteryl nitrate; esters derived from reactions of cholesteryl and carboxylic acids; for example, cholesteryl crotonate; cholesteryl nonanoate; cholesteryl hexanoate; cholesteryl formate; cholesteryl docosonoate; cholesteryl propionate; cholesteryl acetate; cholesteryl valerate; cholesteryl linolenate; cholesteryl oleate; cholesteryl erucate; cholesteryl butyrate; cholesteryl caproate; cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl heptyl carbamate; and alkyl amides and aliphatic secondary amines derived from $3\beta$-amino-$\Delta^5$-cholestene and mixtures thereof; peptides such as poly-γ-benzyl-L-glutamate; derivatives of beta sitosterol such as sitosteryl chloride and amyl esters of cyano benzylidene amino cinnamate. The alkyl groups in said compounds are typically saturated or unsaturated fatty acids, or alcohols, having less than about 25 carbon atoms, and unsaturated chains of less than about five double-bonded olefinic groups. Aryl groups in the above compounds typically comprise simply substituted ring compounds.

Typical suitable non-mesomorphic optically active materials include: derivatives of alcohols such as l-menthol, l-linannol, d-mannitol, d-borneol, and d-guercitol; derivatives of ketones such as d-camphor, d-3-methylcyclohexanone, and 1-6-isopropyl-3-cyclohexanone; derivatives of carboxylic acids such as d-cittronellic acid, 1-citronellic acid, d-chaulmoogric acid, 1-campholic acid, 1-arabonic acid, d-tartaric acid, and 1-ascorbic acid; derivatives of aldehydes such as d-citronellal; derivatives of alkenes such as 1-B-pinane, d-silvesterene, and d-limonene; derivatives of amines such as 1-2-methylpiperidine; derivatives of nitriles such as d-mandelonitrile; derivatives of amides such as d-hydrocarbamide, and mixtures thereof.

Mixtures of the nematic liquid crystalline material and the optically active material can be prepared in organic solvents such a choloroform, petroleum ether, methyl ethyl ketone and the like, which are typically subsequently evaporated from the mixture thereby leaving the liquid crystalline composition. Alternatively, the individual components of the liquid crystalline composition can be combined directly by heating to an appropriate temperature.

The optically negative liquid crystalline composition formed by adding the nematic liquid crystalline substance and an optically active material can be provided in the homeotropic or the homogeneous texture of the nematic mesophase by any suitable method known in the art, such as, for example, aligning agents added to the compositions or coated upon substrates and surface treatments such as rubbing.

The aligning agents may be applied to a suitable substrate upon which the layer of optically negative liquid crystalline composition resides or may be added to the mixture of nematic and optically active material or a combination of coatings and additives can be employed.

Any suitable aligning agent can be used. Typical suitable aligning agents include those added to the nematic liquid crystal material such as, for example, additive aligning materials disclosed in U.S. Pat. No. 3,656,834, hereby expressly incorporated by reference, a typical example of which is hexadecyltrimethylammonium bromide. Other typical aligning agents which may be added to the mixture of nematic and optically active material includes the resinous materials enumerated in U.S. Pat. No. 3,803,050, hereby expressly incorporated by reference, which resins include polyamide resins, epoxy resins, and others as enumerated therein; surfactants (surface active agents) such as, for example, esters of polyhydric alcohols, alkorylated amides, esters of polyorypropylene glycols, ethers of polyoxyalkylene glycols, sulfonated hydrocarbons and their salts, heterocyclic amines, amphoterics such as: cetyl betane, sequestrants such as: trisodium nitrilotriacetate and many others as enumerated therein.

The aforementioned aligning agents to be added to the liquid crystalline composition (mixture of nematic and optically active material) are to be added in accordance with the practice disclosed in the aforementioned patents. For example, a suitable range is broadly disclosed as 0.25% to about 2.5% by weight of the nematic in the former patent; and from about 0.1 and about 10% by weight in the latter patent.

Homeotropic or homogeneous alignment can also be accomplished by coating a suitable substrate upon which the layer of optically negative liquid crystalline material is placed by coating or adding any of the many materials known in the art. Such known coating materials include, for example, silanes such as alcoxysilanes for homoeotropic alignment and additive and coating materials listed in Vol. 61, No. 7, *Proceedings of the IEEE*, p. 823, July, 1973 in the article "Surface-Produced Alignment of Liquid Crystals" by Kahn, Taylor, and Schonhorn; hereby expressly incorporated by reference, for homeotropic and homogeneous alignment. Homogeneous alignment can be accomplished by rubbing the substrate as is well known to those skilled in the art.

Once the optically negative liquid crystalline composition is formed as above described and provided in the homeotropic or homogeneous texture of the nematic mesophase, a voltage or potential is applied at a level sufficient to produce dynamic scattering. The applied voltage will have an electrical field associated with the voltage and the voltage is applied in a manner that provides a direction to the electrical field which is perpendicular to the plane of the layer of liquid crystalline composition; that is, across the thickness of the cell. The voltage level and not the electrical field strength is the important parameter for dynamic scattering. That is, dynamic scattering is dependent upon the amount of voltage and not the thickness of the layer of liquid crystalline composition across which the voltage is applied. Dynamic scattering is well known to and easily recognized by those skilled in the art. When a voltage of such strength is applied in such manner, dynamic scattering is observed. Upon removal of the applied voltage, the liquid crystalline material transforms to the spherulitic texture of which the photograph in FIG. 1 is typically representative.

Figure 1:
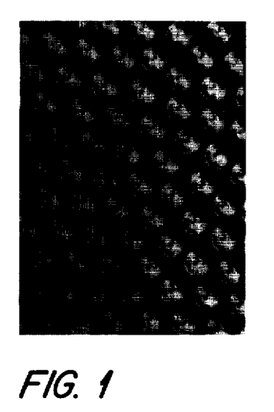
FIG. 1 is a photographic reproduction of a photograph taken through a microscope of an about 19 microns thick layer of a liquid crystalline composition about 0.7% by weight cholesteryl oleyl carbonate and p-methoxy-benzylidene-p'-n butylaniline having spherulites therein the layer not having voltage or potential applied thereacross; the size of the spherulites is typically about 35 microns.

The voltage level and the time during which the voltage is applied are interdependent with respect to producing a relatively densely packed texture (that is, one at least as densely packed as the spherulites in FIG. 1). For example, substantially total transformation to a densely packed spherulitic texture can be typically obtained with the application of voltage of about 15 volts across a 4 micron thick sample of the liquid crystalline layer for a period of about 1 second. On the other hand, for the same layer, generation of substantially the same packing density in a period of about 0.5 second requires a voltage of about 20 volts. Formation of isolated spherulites can be observed down to the millisecond; by control of voltages and times it is possible to obtain a wide gamut of packing densities ranging from one or more small number of spherulites in the liquid crystalline material up to a very dense, closely packed, numerous number of spherulites approaching total transformation of the liquid crystalline material into spherulites. The generation of a closely packed spherulitic texture can also be accomplished by successive application of D.C. pulsed electrical fields, each of which by itself only generates a small number of spherulites. The electrical fields can be conveniently generated by application of D.C. voltages or low frequency A.C. voltages of less than about 1000 Hz. By "low frequency" is herein meant less than about 1000 Hz.

The novel spherulitic texture thus produced is stable. That is, deterioration with time is not detected. The stable spherulitic texture can conveniently be erased by either mechanically shearing the liquid crystalline layer or by applying a high frequency A.C. electrical fiedl, for example, above about 1000 Hz. The phrase "high frequency" is used herein to mean above about 1000 Hz. Erasure is a two step process when the liquid crystalline composition is returned to an originally homogeneous texture.

The erasure of the spherulitic texture and the return of the liquid crystalline material to its original homeotropic texture state involves a two step process and the interdependence of electrical field strength and period of time during which the electrical field is applied. In the homogeneous case, the homogeneous texture returns immediately upon application of the erasing field. With respect to the two step process, it is observed that during application of the high-frequency A.C. electrical field, or erasing field, the liquid crystalline state observable between crossed polarizers is birefringent and substantially uniform. This state of the liquid crystalline material during application of the erasing electrical field is typically identified as the "Schlieren texture". The actual return to the initial state of the liquid crystalline material begins only after removal of the applied erasing, high frequency A.C. electrical field. The portions of the liquid crystalline material which were initially in the homeotropic texture immediately return to such initial state immediately upon removal of the erasing electrical field. The field of view for such regions becomes dark between crossed polarizers. On the other, hand, regions, if any, of the liquid crystalline layer which were not initially homeotropic when regions of interest were homeotropic but which nevertheless were transformed into spherulites or regions containing spherulites, also return to their initial state only upon removal of the high frequency erasing A.C. electrical field. These regions, however, return more slowly to their initial state and the period of time reqired for erasure in these regions is measured in seconds. That is, for such regions less than a minute is typically required for erasure upon removal of the erasing electrical field.

When erasing the spherulitic texture to an initially homogeneous texture, the field of view is dark between crossed polarizers when the axis of polarization of one of the polarizers is placed parallel to the initial direction of the major axes of the molecules. That is, when substrate rubbing is used to provide the homogenous texture, then that axis of polarization is placed parallel to the direction of rubbing.

With respect to the interdependence of the erasing electrical field and the time required for such erasing electrical field strengths, typical parameters at an A.C. frequency of 2 KHz include the application of 100 volts per mil thickness of the liquid crystalline layer applied for about 1 second and about 133 volts per mil thickness of liquid crystalline layer applied for about one-half second; and further include, at an A.C. frequency of about 2 KHz, the application of about 167 volts per mil thickness of liquid crystalline layer for a period of time of about one-tenth second. Erasure is dependent upon electrical field strength; that is, the voltage level and the thickness across which it is applied. Partial erasure of the stable spherulitic texture can occur if the applied erasing electrical field strength is too low or the period of time during which the erasing electrical field is applied is too short. This is analogous to the interdependence of the amount of voltage and time of its application during the application of D.C. or low frequency A.C. voltages for transmission of the liquid crystalline material from its initial state into the spherulitic texture. It will be appreciated, of course, that by control of the erasure parameters of electrical field strength and time during which it is applied, a wide gamut of packing densities can be obtained by partial erasure of a previously existing densely packed spherulitic texture.

With regard to the stable spherulitic texture of which the photograph in FIG. 1 is typically representative, it is noted that the individual spherulites are birefringent and that the array of spherulites is slightly scattering. By "slightly scattering" as used herein is meant scattering which is less intense than dynamic scattering of the same material, when voltage is applied. The optical phenomena of scattering and dynamic scattering is well known to those skilled in the art. Speaking generally, scattering occurs due to interfaces between two kinds of materials, each of which has a different index of refraction. In dynamic scattering, liquid crystalline material containing many regions of different orientations scatters light intensely. Generally speaking, scattering is caused by light scattering centers which may be either an interface between two different kinds of materials or between different regions of orientations in the same material. With respect to dynamic scattering, this is generally observed in nematic liquid crystalline materials upon application of an electrical field of sufficient strength. Without being under the influence of an aligning agent or an electrical field, nematic molecules in any local area of the layer of nematic liquid crystalline material point in one direction although the orientation differs from area to area.

Upon application of an electrical field across the layer of nematic liquid crystalline material, the molecules of the nematic line up with their long axes at some predetermined relationship to the field direction, depending upon materials, electrical field strength and presence or absence of aligning agents. When the electrical field is of sufficient strength to cause ions to move towards the electrodes by which the electrical field is applied, the ions disrupt the order of alignment of the nematic molecules and create relatively large regions of turbulence. Dynamic scattering results.

The advantageous transformation provided by the instant invention differs fundamentally from the previously reported storage effects in liquid crystalline mixtures of cholesterics and dielectrically negative nematics. The previously reported effects are based upon reversible transformation between the Grandjean (planar) texture and the focal-conic textures of the cholesteric mesophase. The initial state of the liquid crystalline material in accordance with the advantageous transformation process of the instant invention is the above described aligned state of the nematic doped with optically active materials. This initial state is clear, the optic sign is positive and the overall optical characteristics are that of a nematic. On the other hand, in the previously reported transformations, the initial state is characterized by a negative optic sign and the general optical characteristics are that of a cholesteric. The final spherulitic texture state of the transformation provided by this invention is also very different from the final state of the previously reported transformations. A single layer of spherulites, preferably closely packed, is presented by the spherulitic texture and is readily recognized as being very different from the previously described cholesteric or nematic texture.

Interesting, reproducible effects were observable during experimentation and characterized the liquid crystalline material in which the spherulitic texture is created. These characteristics are set forth immediately below for the nematic methoxy benzylidene-p'-n butylaniline (MBBA) doped with choleseryl oleyl carbonate (COC) in the amount of about 2.2% by weight and placed in an unsealed cell consisting of two flat, rectangular, indium oxide coated glass plates separated by about 0.15 mil Mylar spacer. A thin film of alcoxysilane was overcoated upon the indium oxide coating of the glass plates. The doped nematic was sandwiched between the alcoxysilane films and the indium oxide coatings were electrical connected to a D.C. voltage source. Although the ovservations reported here refer to the particular doped nematic, very similar observations were made with different liquid crystalline mixtures. Some of the below reported parameters varied somewhat, of course, for the particular mixture utilized.

The particular unsealed cell constructed as above was experimented with and it was determined that under the influence of D.C. electrical fields, two distinct regions are observable: (a) at voltages smaller than required for dynamic scattering, all electro-optic effects are transient. The cell returns to its initial state after field removal; and, (b) if the applied voltage is sufficient to produce dynamic scattering, the entire cell transforms to the stable spherulitic texture upon removal of the applied voltage and exhibits dynamic scattering during the application of such voltage. With the voltage setting at about 2.0 volts the liquid crystalline material becomes birefringent and at about 3.0 volts striations appear which bear similarities to both Williams domains and large pitch focal-conic textures. As the voltage is increased, a branching effect is observable between about 4 to about 6 volts with short branches growing from the main filaments. At about 7.0 volts, swirling begins. Turning off the voltage at this point, i.e., removing the electrical field, results in formation of the first domains of spherulites. When the voltage is increased to about 12.0 volts, and at higher voltages, the liquid crystalline material becomes dynamically scattering. Upon removal of such dynamic scattering voltages, first branching, then circular motion, and finally formation of relatively closely packed spherulites are observed all across the cell. The spherulites typically have diameters of from about 5 microns to about 100 microns with some minor deviation occurring for any one sample. Between crossed polarizers it was observed that the spherulites were birefringent and that the liquid crystalline material between spherulites were in the homeotropic texture of the nematic mesophase. Dense packing of the spheres generates a hexagonal structure which becomes most evident between parallel polarizers. These events were also observable with the low frequency A.C. electrical fields, including the formation of the spherulitic texture.

During experimentation, it was determined that the helical pitch (p) and the thickness of the layer of liquid crystalline composition provided on a substrate in contact with an aligning agent is critcially interdependent to the formation of the novel spherulitic texture. As indicated in Table I below, the ratio of the helical pitch of the optically negative liquid crystalline composition to the thickness of the layer thereof on the substrate and in contact with the aligning agent must be within the range of about 1 to about 10. Ratios within the range of from about 3.5 to about 5 are preferred because such ratios yield a stable spherulitic texture having a packing density of spherulites at least substantially approaching the packing density depicted in the photograph of FIG. 1. Ratios within the ranges of from about 1 to about 3.5 and from about 5 to about 10 produce a spherulitic texture which has a relatively low packing density of spherulites. This is illustrated in Table I below which lists typical cell thicknesses and helical pitches, as above described, both in microns. The helical pitch is read along horizontal lines and the cell thicknesses are read along vertical lines; the intersection denotes the combination of helical pitch and cell thickness utilized in a typical attempt to form the novel spherulitic texture of the instant invention. The designation P stands for preferred, indicating the formation of spherulites with a packing density substantially approaching that represented by the photograph of FIG. 1. The designation S, indicating satisfactory results, stands for a packing density of about one-half that represented in the photograph of FIG. 1, or a lesser packing density. Combinations of helical pitch and cell thickness other than those designated by either capital letter P or capital lesser S did not form stable spherulites.

TABLE I

| PITCH ($\mu$) | CELL THICKNESS ($\mu$) | | | |
| --- | --- | --- | --- | --- |
| | 4 | 12 | 19 | 25 |
| 100 | | | P | P |
| 60 | | P | P | S |
| 40 | S | P | S | |
| 15 | P | S | | |

For production of spherulites having a satisfactory packing density, the helical pitch can satisfactorily be in the range of from about 5 microns to about 200 microns and the cell thickness can satisfactorily be in the range of from about 1 micron to about 100 microns. For the production of spherulites having a preferred density, the helical pitch is preferably within the range of from about 15 microns to about 100 microns and the cell thickness is preferably within the range of from about 4 microns to about 25 microns. Spherulites can be produced with helical pitches outside the range of from about 5 microns to about 200 microns and with cell thicknesses outside the range of about 1 micron to about 100 microns, provided the ratio of helical p itch to cell thickness is within the range of from about 1 to about 10. It will be appreciated, of course, that the cell thickness in microns is equal to the thickness of the layer of liquid crystalline composition. Therefore, the satisfactory ranges and preferred ranges for cell thicknesses are the satisfactory and preferred ranges, respectively, for layers of liquid crystalline composition employed in accordance with the instant invention.

Producing and Utilizing Variable Optical Diffraction

FIGS. 1 through 4 and FIGS. 1A through 4A have been described in some detail in the brief description of the drawings, above. It is to be noted that FIGS. 1 through 4 illustrate the increase in size and change in shape resulting therefrom of individual spherulites in the array of spherulites in the spherulitic texture described above, when increasing voltage or potential is applied across the spherulitically textured portion of the layer of liquid crystalline composition. It is to be noted that the application of voltage or potential causes an increase in the size of the individual spherulites and that as the size of the individual spherulites continue to increase their shape becomes increasingly more sharply hexagonal in nature. FIGS. 1A through 4A, it will be noted, exemplify the fact that the diffraction pattern produced by directing light upon the spherulitic texture varies in size and shape corresponding to the size and shape of the individual spherulites.

The process according to the instant invention which provides variable optical diffraction, comprises the steps of providing the spherulitic texture of the liquid crystalline composition, directing light upon the spherulitic texture thereby causing the light to be diffracted, applying a voltage across the spherulitic texture to vary the size or shape, or both, of the individual spherulites to cause a variation in the diffraction of the light directed upon the spherulitic texture.

The first step of providing the spherulitic texture of the liquid crystalline composition has been described above in detail.

The step of directing light upon the spherulitic texture may comprise any suitable light from any suitable light source. White light, alone or in combination with filters, modulators, polarizers, or other peripherals can be successfully employed in the present invention. Typical suitable sources of light include in addition to white light or modified white light, lasers and other monochromatic sources of light, The light may be in any region of the electromagnetic spectrum wherein the electromagnetic radiation wavelength or frequency permits that radiation to be diffracted by any particular combination of materials and compositions chosen for the practice of the present invention. Polarizers can optionally be inserted between the light source and the layer of liquid crystalline material, or between the layer of liquid crystalline material and the screen, or both; the effect of such optional use being a change in the intensity distribution of the diffraction pattern produced. Other optical accessories such as one quarter waveplates, etc. can be used in place of the polarizers. Furthermore, the variable optical diffraction produced in accordance with the present invention may be produced either in transmission or reflection. That is, variable diffraction of light is produced in accordance with the invention in the case where the light directed upon the spherulitic texture is transmited through the layer of liquid crystalline composition and in the case where the light directed upon the spherulitic texture is reflected from a reflective surface.

Figure 2:
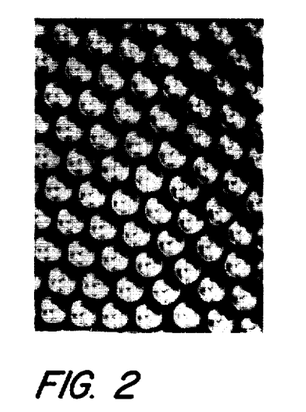
FIG. 2 is a photographic reproduction of a photograph of the spherulitic texture of FIG. 1 under the influence of about 2 volts applied potential; the same conditions of FIG. 1 otherwise pertaining; the size of the spherulites is typically about 37 microns.

The geometry of the diffraction pattern observed for a given array of spherulites, e.g., the particular array of FIG. 1, the particular array of FIG. 2, and so forth, remains the same even though light of different frequencies are utilized. In that case, however, while the pattern of diffraction remains the same, the size of the pattern varies directly with the wavelength of light utilized. The smaller the wavelength of light utilized, the smaller the pattern of diffraction for the identical array of spherulites and the larger the wavelength of light utilized the larger the pattern of diffraction for the identical array of spherulites.

It will be noted from the above description of producing the spherulitic texture of a liquid crystalline composition, that the spherulites are produced upon removal of an applied D.C. or low frequency A.C. voltage potential. It has been discovered that the spherulites, created upon removal of the voltage or potential utilized in forming the spherulites, remain the same size in the absence of a subsequent application of voltage or potential. However, it has been discovered in accordance with the present invention, that subsequent to formation of the spherulitic texture, the subsequent application of a D.C. or low frequency A.C. voltage or potential will cause an increase in the size of the individual spherulites. This effect is represented in FIGS. 1 through 4 and FIGS. 1A through 4A. It has been further discovered in accordance with the present invention that if the subsequently applied voltage or potential is up to about one-half the voltage or potential required to produce dynamic scattering in the liquid crystalline composition, then upon removal of that voltage or potential the spherulites which had increased in size under the influence of that applied voltage or potential will, upon removal, return to the size they initially possessed upon being formed. It has been discovered in accordance with the present invention that if the voltage or potential applied subsequent to the formation of the spherulites and for the purpose of increasing the size of the spherulites is from about one-half to about the full value of the voltage or potential required for dynamic scattering of the liquid crystalline composition that the spherulites are distorted upon removal of that voltage or potential. That is, upon removal of that voltage or potential (at a value of from about one-half to the full value required for dynamic scattering) the spherulites do not assume or revert back to the initial state that they possessed upon being formed. Rather, the spherulites assume a different size and shape which remain upon removal of the higher value voltage or potential.

If, at the formation of the spherulites, and in an attempt to increase the size of the spherulites in accordance with the present invention by the application of a voltage or potential which is at or above the value required for dynamic scattering of the liquid crystalline composition, the spherulitic textures are affected in that a new spherulitic pattern is formed.

It is seen, therefore, that when the lower aforementioned voltage or potential value is applied across the spherulitic texture, the variation in size or shape, or both, of the spherulites and the corresponding diffraction pattern is sustained by the application of the voltage or potential. On the other hand, if the voltage or potential applied in accordance with the practice of this invention is within the higher above described values, then the change in the size or shape or both, of the spherulites and the corresponding diffraction patterns assume characteristics upon removal of the higher value voltage or potential which are different from the corresponding characteristics of the spherulites in both the initial spherultiic texture and the array of the spherulites produced by the higher value voltages or potentials.

It will be understood, of course, that voltages or potentials applied in accordance with the present invention and within the lower values above described can be utilized to provide reproducible varying results. That is, the size and shape characteristics of, for example, the array of spherulites in FIG. 1 and for that particular composition, can be changed into the array of FIG. 2 upon application of about 2 volts and can subsequently be changed into the array of either FIG. 3 or FIG. 4 by the application of the appropriate value. Conversely, once changed into a particular array, the spherulites can be changed into another array be decreasing the value of the voltage or potential so long as the voltage or potential applied is within the above described lower range of values. In summary, then, within the above described lower range of values, the spherulites can be reproducibly changed in size or shape, or both, and with an accompanying reproducible change in diffraction pattern, by increasing or decreasing the voltage or potential applied to the spherulitic texture.

Figure 5:
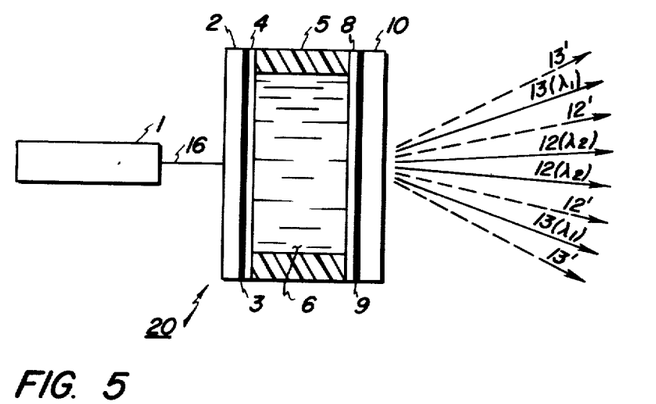
FIG. 5 is a schematic cross-sectional illustration of a typical embodiment of the invention which produces variable diffraction of light.
Figure 6:
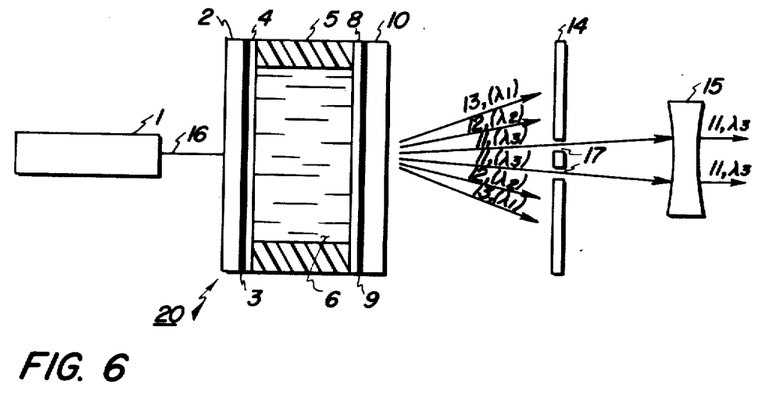

Referring now to FIG. 5, there is seen a light source 1 producing light 16 which strikes cell 20 and is diffracted in transmission therethrough. Diffraction is depicted by arrows 13 illustrating the diffraction of light at a wavelength $\lambda_1$ and arrows 12 illustrating the diffraction of light at a wavelength $\lambda_2$. Arrows 13' and 12' illustratively depict a change in diffraction resulting from an increase in the size of the spherulites in the liquid crystalline composition. Cell 20 can conveniently comprise any of the cells above described with respect to the production of the spherulitic texture. In FIGS. 5 and 6, the components of cell 20 which are above described comprise: flat, rectangular glass plates 2 and 10; conductive coatings 3 and 6; aligning agent coatings 4 and 8; spacer 5; and, liquid crystalline composition 6. The combination of glass plates 2 and 10 with conductive coatings 3 and 8, as illustrated, constitute conductive electrodes by which the voltages or potentials are applied. In the transmission embodiment of the present invention, the conductive electrodes are transparent to the electromagnetic radiation utilized. Typical suitable transparent, conductive electrodes include glass or plastic substrates having substantially transparent and continuously conductive coatings of conductors such as tin, indium oxide, aluminum, chromium, tin oxide, or any other suitable conductor. These substantially transparent conductive coatings are typically evaporated onto the more insulating transparent substrate. NESA glass, a tin oxide coated glass manufactured by the Pittsburgh Plate Glass Company, is a commercially available example of a typical transparent conductive electrode material.

Aligning agent coatings 3 and 8 are optional in accordance with the description given above with regard to the production of the spherulites. However, when aligning agents are utilized, they may comprise any materials listed above. In accordance with the above description of aligning agents, coatings 4 and 8 may be dispensed with and aligning agents may be added to the liquid crystalline composition or the substrates otherwise treated in accordance with the above description.

Spacer 5, which separates the electrodes and contains the layer of liquid crystalline composition between the electrodes, is typically chemically inert, substantially insulating and has appropriate dielectric characteristics. Materials suitable for use as insulating spacers include cellulose acetate, cellulose triacetate, cellulose acetate butyrate, polyurethane elastomers, polyethylene, polypropylene, polyesters, polystyrene, polycarbonates, polyvinylfluoride, polytetrafluoroethylene, polyethylene terephthalate, and mixtures thereof.

The voltage or potential applied in accordance with the present invention is provided by providing conductive coatings 3 and 6 with suitable electrical leads in electrical connection with a suitable voltage source. As previously mentioned, suitable voltage sources are D.C. voltages and A.C. voltages of low frequency. "Low" and "high" as used in modifying frequency of the A.C. voltage is used herein with respect to the present invention identical with its use in the description of the production of spherulites, above. That is, low frequency means below about 1000 Hz, and high frequency means at or above about 1000 Hz. It will be appreciated, of course, that the voltage source may be a suitable variable source which can be selectively utilized to provide either D.C. or A.C. voltage or a desired value and frequency, especially with regard to reproducibly varying the array of spherulites as previously described.

It will be appreciated that FIG. 5 is illustrative only and that more elaborate variations can be practiced in accordance with the present invention, though which are based on the same fundamental principles illustrative depicted by FIG. 5. For example, light source 1 may be chosen to provide white light 16 so that the entire visible spectrum is diffracted and could be represented by additional arrows in between the red arrows 13 and 13'.

FIG. 6 illustrates a specific applicaton of the diffraction illustratively provided by FIG. 5. In FIG. 6 like numerals refer to like components as in FIG. 5. Additionally, diffracted light in FIG. 6 is shown being directed at an optical stop 14 and subsequently being directed at optional lens 15. Optical stop 14 is comprised of material which is opaque or non-transmissive to the diffracted electromagnetic radiation illustratively depicted in FIG. 6 by arrows 11, 12, and 13, representative of light at wavelengths $\lambda_1$, $\lambda_2$, and $\lambda_3$, respectively. Optical stop 14 is provided with openings, apertures, slits, or other passages denoted in FIG. 6 as 17 which are positioned relative to the diffracted electromagnetic radiation such that at least one wavelength of electromagnetic radiation is permitted to pass through optical stop 14.

It will be appreciated, of course, that optical stop 14 may be provided with any number of openings or regions 17 which are transmissive to diffracted electromagnetic radiation and positioned relative to the diffracted electromagnetic radiation so that any number of wavelengths or any particular band of electromagnetic radiation, or combinations of both, are allowed to pass through optical stop 14.

For example, in FIG. 6, openings or regions 17 of optical stop 14 are illustratively depicted as allowing only light at wavelength $\lambda_3$ to pass through optical stop 14. All other diffracted electromagnetic radiation is blocked from passing through optical stop 14.

Thus, it can be seen that the combination of cells 20 and optical stop 14 comprises a band pass filter; that is, a filter which allows a band of predetermined wavelengths of radiation to pass therethrough while rejecting radiation at wavelengths outside the predetermined band. It will be appreciated, of course, that the number and locations of openings or regions 17 in optical stop 14 can be such that relative to the light diffracted, all light diffracted is allowed to pass through optical stop 14 except for a band of radiation or predetermined wavelengths. Thus, in this case, cell 20 and optical stop 14 together comprise a notch filter.

Optional lens 15 may be provided when it is desired be provide the diffracted electromagnetic radiation passing through optical stop 14 in parallel rays of electromagnetic radiation. Optional lens 15 may optionally be a collecting lens when it is desired to focus the diffracted electromagnetic radiation passing through optical stop 14 upon some point or plurality of points at a predetermined distance from optical stop 14.

For example, optional optical lens 15 is preferably a collecting lens when the embodiment of FIG. 6 is utilized as a color display. Referring to FIG. 6, and bearing in mind that the spherulites in the film 6 of liquid crystalline composition can be varied in size or shape, or both, with a corresponding change in diffraction of light, it will be appreciated that, for example, the diffraction change can result in a change in the wavelength and therefore a change in the color of electromagnetic radiation passing through optical stop 14. This can best be seen by referring to the diffracted light in FIG. 5 where a shift of the light at wavelength $\lambda_2$ from position 12 to position 12' is a shift toward the light at a wavelength $\lambda_1$. In this manner, an image of one color can be changed to an image of another color.

Finally, it will be appreciated that the combination of cell 20 and optical stop 14 can be utilized as a beam splitter when the splitting of a light beam is desired.

EXAMPLES

In all of the examples, flat rectangular glass plates are coated on one side with indium oxide. Each of the oxide coatings are provided with an electrical lead for connection to a terminal of a suitable voltage source. The indium oxide coatings are overcoated with a thin coating of alcoxysilane. Cells are constructed by placing the glass plate in a parallel relationship, spaced apart by a Mylar spacer, coated sides oppositely facing one another.

EXAMPLE I

A composition of about 2.2% by weight cholesteryl oleyl carbonate (hereafter COC) and p-methoxybenzylidene-p'-n-butylaniline (hereafter MBBA) is placed in a cell provided with alcoxysilane coatings and an about 4 micron thick spacer. A D.C. voltage of about 15 volts is applied across the cell for about 1 second and removed. Upon removal, a densely packed spherulitic texture is observed between crossed polarizers comprising spherulites surrounded by the composition in the homeotropic texture of the neumatic mesophase.

EXAMPLE II

Example I is followed in all particulars except the following: the amount of COC is about 0.7% by weight, the spacer thickness is about 19 microns, the D.C. voltage is about 12 volts and the time of application is about 3 seconds. Upon removal of the applied D.C. voltage, a densely packed spherulitic texture is observed between crossed polarizers comprising the spherulites of FIG. 1 surrounded by the composition in the homeotropic texture of the nematic mesophase. The spherulites are from about 32 to about 43 microns in size, typically 35 microns, as viewed in FIG. 1.

EXAMPLE III

Figure 1A:
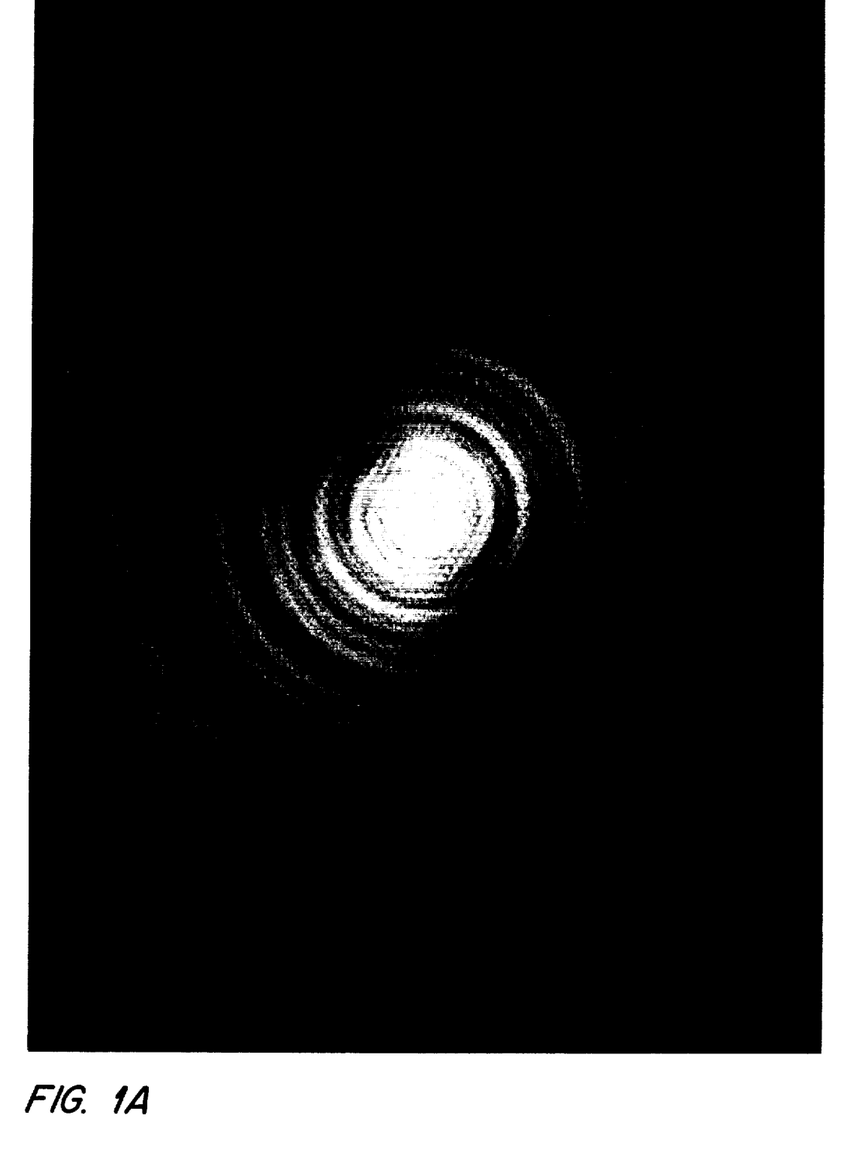
FIG. 1A is a photographic reproduction of a photograph of a diffraction pattern of the array of spherulites in FIG. 1; the light source utilized being an Argon laser. The layer of liquid crystalline composition being interpositioned between the laser source and a screen at a distance of about 8 inches from the laser and about 10¼ inches from the screen.

An Argon laser beam is passed through the spherulitic texture produced in Example I and the diffraction pattern of FIG. 1A is obtained.

EXAMPLE IV

While the Argon laser beam and resulting diffraction pattern of Example III are maintained, a D.C. voltage of about 2 volts is applied across the cell. The spherulites grow in size and are from about 34 to 46 microns in size, typically 37 microns, as viewed. FIG. 2 is a photograph of the array of spherulites produced by the 2 volt D.C. applied voltage. The diffraction pattern changes upon application of the voltage to that of FIG. 2A.

EXAMPLE V

The voltage applied in Example IV is removed. The spherulites are reduced in size to that of, and revert to the array of, Example II (FIG. 1). The diffraction pattern returns to that of Example III (FIG. 1A).

EXAMPLE VI

Figure 3:
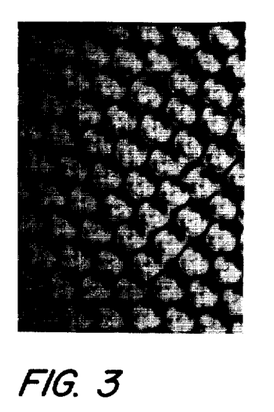
FIG. 3 is a photographic reproduction of a photograph of the spherulitic texture of FIG. 1 under the influence of about 3 volts applied potential; the conditions otherwise being the same as in FIG. 1; the size of the spherulites is typically about 39 microns.

While the Argon laser beam and resulting diffraction pattern of Example III are maintained, a D.C. voltage of about 3 volts is applied across the cell. The spherulites grow in size and are from about 37 to about 48 microns, typically about 39 microns, as viewed. FIG. 3 is a photograph of the array of spherulites produced by the 3 volts D.C. applied voltage. The diffraction pattern changes upon application of the voltage to that of FIG. 3A.

EXAMPLE VII

The voltage applied in Example VI is removed. The spherulites are reduced in size to that of, and revert to the array of, Example II (FIG. 1). The diffraction pattern returns to that of Example III (FIG. 1A).

EXAMPLE VIII

Figure 2A:
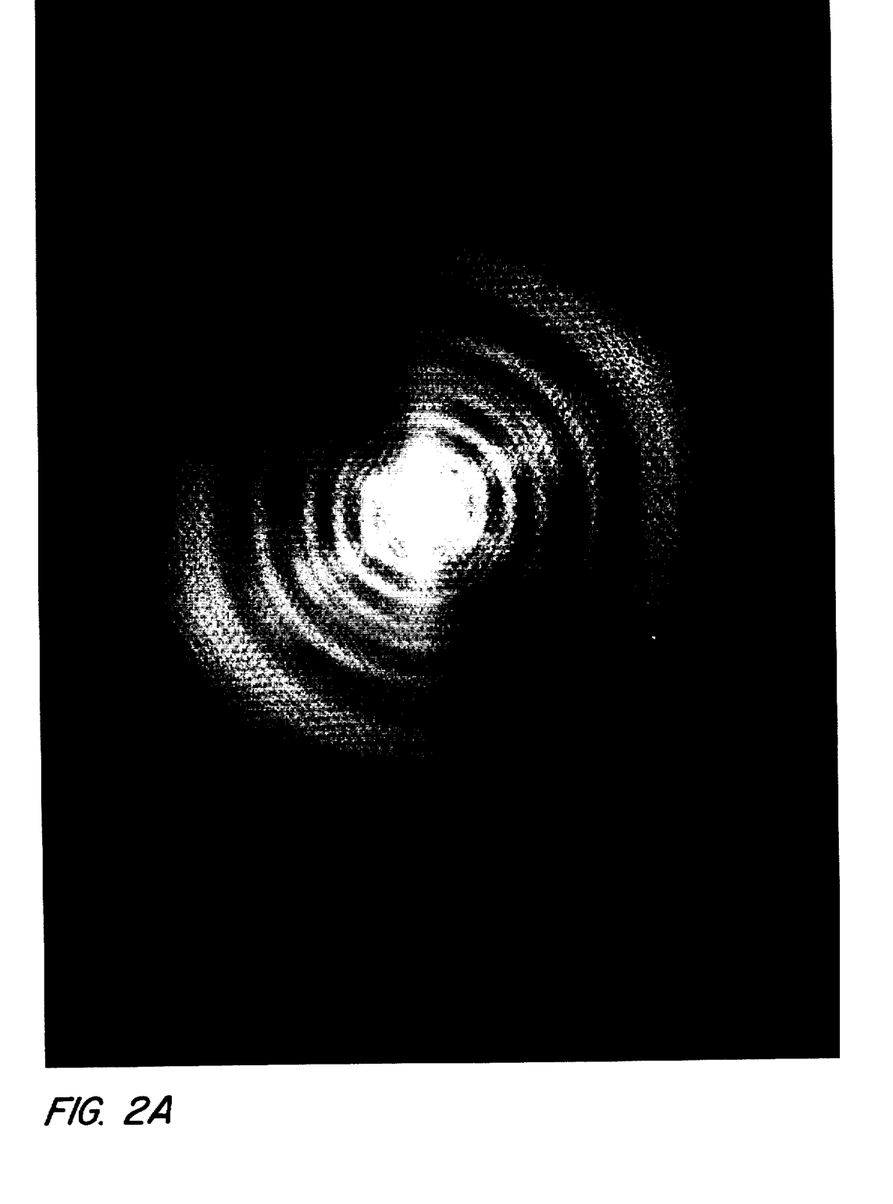
FIG. 2A is the diffraction pattern corresponding to the array of spherulites depicted in FIG. 2; the conditions of FIG. 1A otherwise being present.

The voltage applied in Example VI is reduced to about 2 volts D.C. The spherulites are reduced in size to that of, and assume the array of, Example IV (FIG. 2). The diffraction pattern becomes that of Example IV (FIG. 2A).

EXAMPLE IX

Figure 4:
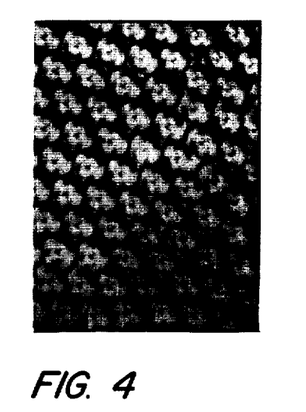
FIG. 4 is a photographic reproduction of a photograph of the spherulitic texture of FIG. 1 under the influence of about 4 volts D.C. applied potential; the conditions otherwise being the same as in FIG. 1; the size of the spherulites is typically about 44 microns.
Figure 4A:
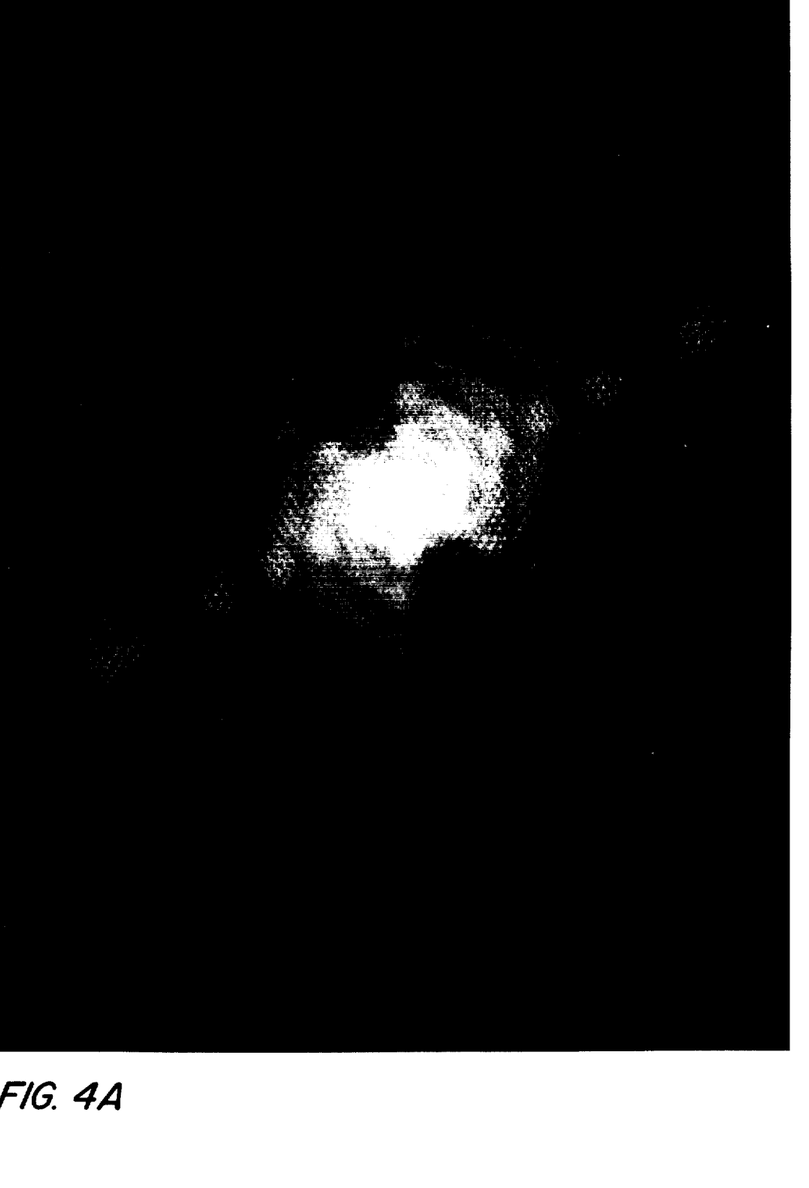
FIG. 4A is a photographic reproduction of a photograph of a diffraction pattern corresponding to the array of spherulites in FIG. 4; the conditions otherwise being identical to the conditions of FIG. 1A.

While the Argon laser beam and resulting diffraction pattern of Example III are maintained, a D.C. voltage of about 4 volts D.C. is applied across the cell. The spherulites grow in size and are from about 40 to 54 microns, typically about 44 microns, viewed. FIG. 4 is a photograph of the array of spherulites produced by the 4 volts D.C. applied voltage. The diffraction pattern changes upon application of the voltage to that of FIG. 4A.

EXAMPLE X

The voltage applied in Example IX is removed. The spherulites are reduced in size to that of, and revert to the array of, Example II (FIG. 1). The diffraction pattern returns to that of Example III (FIG. 1A).

EXAMPLE XI

The voltage applied in Example IX is reduced to about 2 volts D.C. The spherulites are reduced in size to that of, and assume the array of, Example IV (FIG. 2). The diffraction pattern becomes that of Example IV (FIG. 2A).

EXAMPLE XII

Figure 3A:
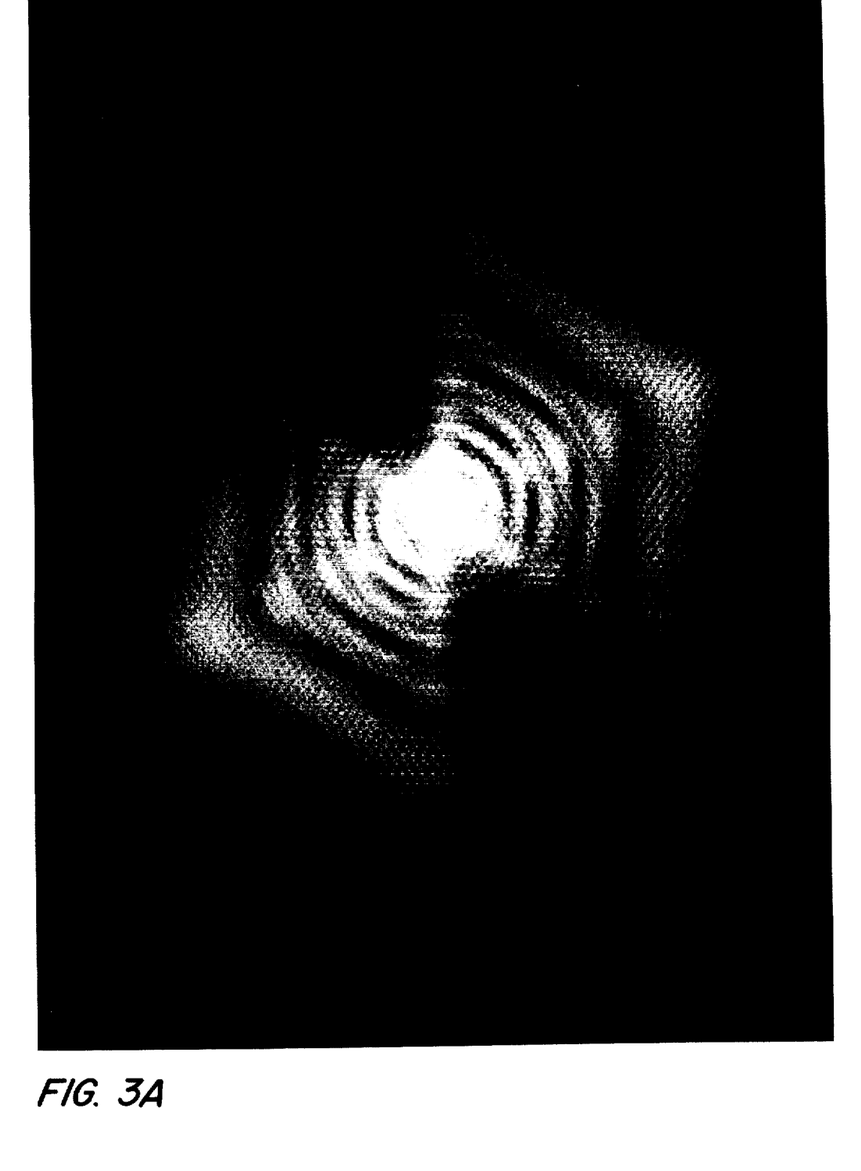
FIG. 3A is a photographic reproduction of a photograph of a diffraction pattern produced by the array of spherulites of FIG. 3; the conditions otherwise being identical to the conditions of FIG. 1A.

The voltage applied in Example IX is reduced to about 3 volts D.C. The spherulites are reduced in size to that of, and assume the array of, Example VI (FIG. 3). The diffraction pattern becomes that of Example VI (FIG. 3A).

EXAMPLE XIII

While the Argon laser beam and resulting diffraction pattern of Example III are maintained, a D.C. voltage of about 12 volts is applied. Dynamic scattering is observed; and, the array of spherulites and diffraction of Example III vanish.

EXAMPLE XIV

The about 12 volts D.C. voltage applied in Example XIII is removed. A new spherulitic texture is created.

While the invention has been described in detail with respect to various preferred embodiments thereof, it is not intended to be limited thereto but rather it will be appreciated by those skilled in the art that modifications and variations are possible which are within the spirit of the invention and the scope of the claims.

For example, it will be understood that the portion or region of interest of the layer of liquid crystalline composition, and having an array of spherulites, can be in imagewise configuration. The resulting imagewise configured array of spherulites can be utilized whenever diffracted images are desired. Alternatively, a non-imagewise configured array of spherulites can be utilized to diffract imagewise configured electromagnetic radiation.

What is claimed is:

1. A method of variably diffracting light, comprising:
   a. providing on a substrate a layer of aligned liquid crystalline composition comprising a dielectrically negative nematic liquid crystalline material and from about 0.4% to about 3% by weight of an optically acitve material, said liquid crystalline material when not in the aligned state being optically negative and having a light reflection band centered about $\lambda_o = 2np$ where $n$ = index of refraction and $p$ = helical pitch, the ratio of the helical pitch of the non-aligned liquid crystalline composition to the layer thickness of liquid crystalline composition being from about 1 to about 10, said layer of aligned liquid crystalline composition comprising spherulitic regions of liquid crystalline composition;
   b. directing light upon said spherulitic regions wherein said light is diffracted; and
   c. applying a voltage across said layer of liquid crystalline composition in an amount less than that required to produce dynamic scattering in said layer of liquid crystalline composition wherein the spherulitic regions of said liquid crystalline composition are increased in size and diffraction of said light is correspondingly altered.

2. A method of variably diffracting light, comprising:
   a. providing on a substrate, a layer of liquid crystalline composition comprising a dielectrically negative nematic liquid crystalline material and from about 0.4% to about 3% by weight of an optically active material, said liquid crystalline composition when out of contact with an aligning agent or treated substrate being optically negative and having a light reflection band centered about $\lambda_o$ equal to $2np$, where $n$ = index of refraction and $p$ = helical pitch of said liquid crystalline composition, said liquid crystalline composition when in contact with an aligning agent or treated substrate being in the homeotropic or homogeneous texture of the nematic mesophase, said liquid crystalline composition when in the homeotropic or homogeneous texture of the nematic mesophase capable of undergoing electrically induced transition into a spherulitic texture upon removal of an applied voltage; the ratio of said helical pitch to the thickness of said layer being from about 1 to about 10; an aligning agent or treated substrate in contact with said layer of liquid crystalline composition; and, within a portion of interest of said layer of liquid crystalline composition, an array of spherulites, said spherulites lacking the optical characteristics of the homeotiopic or homogeneous texture of the nematic mesophase and being surrounded by said liquid crystalline composition having the optical characteristics of the homeotropic or homogeneous texture of the nematic mesophase;

b. providing a light source and directing light from said source upon said layer portion of interest having said array of spherulites wherein light from said light source undergoes diffraction; and c. applying a voltage across said layer portion of interest in an amount less than that required to produce dynamic scattering in said layer of liquid crystalline composition wherein the spherulites are increased in size and the diffraction of light from said light source is correspondingly altered.

3. The method according to claim 2 wherein in step (b) the light from said light source is transmitted through said layer of liquid crystalline composition and said substrate.

4. The method of claim 2 wherein said substrate is a reflective substrate and wherein in step (b) the light from said light source is reflected from said substrate.

5. The method of claim 2 further including a linear polarizer positioned between said light source and said layer of liquid crystalline composition.

6. The method of claim 2 wherein said applied voltage is a D.C. voltage.

7. The method of claim 6 wherein said voltage is applied in an amount up to about one-half the amount of voltage required to produce dynamic scattering in said layer of liquid crystalline composition.

8. The method of claim 2 wherein said voltage is an A.C. voltage at a frequency of up to about 1000 Hz.

9. The method of claim 8 wherein said voltage is applied in an amount up to to about one-half the amount of voltage required to produce dynamic scattering in said layer of liquid crystalline composition.

10. The method of claim 2 wherein, in step (c) the spherulites become hexagonal in shape.

11. The method of claim 2 further including the transmission of at least one wavelength of diffracted light through an optical stop.

12. The method of claim 11 wherein only one wavelength of diffracted light is passed through the optical stop.

13. The method of claim 12 wherein said one wavelength of diffracted light is in the visible region of the spectrum.

14. The method of claim 11 wherein all but one wavelength of diffracted light is passed through the optical stop.

15. The method of claim 14 wherein said all but one wavelength of diffracted light is in the visible region of the spectrum.

16. The method of claim 11 wherein said at least one wavelength of diffracted light transmitted through said optical stop is further transmitted through a collimating lens, 17. The method of claim 11 wherein said at least one wavelength of diffracted light transmitted through said optical stop is further transmitted through a collecting lens.

18. The method of claim 2 wherein said light source comprises a white light source.

19. The method of claim 2 wherein said light source comprises a laser.

20. The method of claim 2 wherein the light directed upon said layer portion of interest in step (c) is in imagewise configuration.

21. The method of claim 2 wherein the layer portion of interest having said array of spherulites is in imagewise configuration.

22. The method according to claim 2 further including the step (d) of decreasing or increasing the voltage applied in step (c) wherein the size of said spherulites is decreased or increased, respectively.

* * * * *

UNITED STATES PATENT AND TRADEMARK OFFICE
CERTIFICATE OF CORRECTION

PATENT NO. : 3,909,114
DATED : September 30, 1975
INVENTOR(S) : Werner E.L. Haas and James E. Adams It is certified that error appears in the above-identified patent and that said Letters Patent are hereby corrected as shown below:

Column 5, line 11, "ration" should be -- ratio -- .

Column 8, line 7, "fiedl" should be -- field -- .

Column 10, line 13, "choleseryl" should be -- cholesteryl -- .

Column 11, line 1, "critcially" should be -- critically -- .

Column 11, line 31, "lesser" should be -- letter -- .

Column 11, line 56, "p itch" should be -- pitch -- .

Column 13, line 61, "spherultiic" should be -- spherulitic -- .

Signed and Sealed this

Third Day of August 1976

[SEAL]

Attest:

RUTH C. MASON
*Attesting Officer*

C. MARSHALL DANN
*Commissioner of Patents and Trademarks*